(12) United States Patent
Chiu et al.

(10) Patent No.: US 11,960,106 B2
(45) Date of Patent: Apr. 16, 2024

(54) AUGMENTED REALITY DEVICE, NOTEBOOK, AND SMART GLASSES

(71) Applicant: Acer Incorporated, New Taipei (TW)

(72) Inventors: Yi-Jung Chiu, New Taipei (TW);
Wei-Kuo Shih, New Taipei (TW);
Shih-Ting Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 690 days.

(21) Appl. No.: 16/731,057

(22) Filed: Dec. 31, 2019

(65) Prior Publication Data

US 2020/0218085 A1 Jul. 9, 2020

(30) Foreign Application Priority Data

Jan. 3, 2019 (TW) .................. 108100256

(51) Int. Cl.
*G02B 30/56* (2020.01)
*G03H 1/22* (2006.01)
*G06F 1/16* (2006.01)

(52) U.S. Cl.
CPC .......... *G02B 30/56* (2020.01); *G03H 1/2294* (2013.01); *G06F 1/1607* (2013.01); *G06F 1/1616* (2013.01); *G06F 1/1684* (2013.01)

(58) Field of Classification Search
CPC .... G02B 2027/0134; G02B 2027/0136; G02B 2027/0132; G02B 30/20; G02B 30/22; G02B 30/26; G02B 30/40; G02B 30/60; G02B 30/56; G02B 5/31; G02B 27/0172; G03H 1/2294; G03H 2001/221; G03H 2001/2231; G03H 2210/30; G03H 2223/23; G03H 2227/02; G03H 1/2205; G06F 1/1607; G06F 1/1616; G06F 1/1684; G06F 1/1639; G03B 21/142
USPC .......................... 359/27, 466, 471, 473, 464
See application file for complete search history.

(56) References Cited

U.S. PATENT DOCUMENTS

| | | | |
|---|---|---|---|
| 5,187,597 A * | 2/1993 | Kato .................... | G02B 5/1876 359/13 |
| 7,236,278 B2 * | 6/2007 | Togino ................. | G02B 5/0278 359/449 |
| 8,395,833 B2 * | 3/2013 | Schwerdtner ........ | G03H 1/2205 359/9 |

(Continued)

FOREIGN PATENT DOCUMENTS

| CN | 102809818 | 12/2012 |
|---|---|---|
| CN | 106170729 | 11/2016 |

(Continued)

*Primary Examiner* — Jade R Chwasz
(74) *Attorney, Agent, or Firm* — JCIPRNET (57) ABSTRACT

The disclosure provides an augmented reality (AR) device, a notebook, and smart glasses. The AR device includes a laser source, a spatial light modulator (SLM), and a hologram optical element (HOE). The laser source provides a coherent laser ray. The SLM provides a diffraction pattern solely corresponding to the coherent laser ray. When the SLM receives the coherent laser ray, the diffraction pattern diffracts the coherent laser ray as a hologram in response to the coherent laser ray. The HOE provides a concave mirror effect merely in response to a wavelength of the coherent laser ray, wherein the HOE receives the hologram and magnifies the hologram as a stereoscopic virtual image.

11 Claims, 5 Drawing Sheets

(56) References Cited

U.S. PATENT DOCUMENTS

| | | | |
|---|---|---|---|
| 9,019,584 B2 * | 4/2015 | Yamaichi | G03H 1/2294 359/9 |
| 2010/0165430 A1 * | 7/2010 | Buschbeck | G03H 1/2294 359/9 |
| 2016/0313556 A1 | 10/2016 | Futterer | |
| 2016/0327797 A1 * | 11/2016 | Bailey | G03H 1/2645 |
| 2017/0255013 A1 | 9/2017 | Tam et al. | |

FOREIGN PATENT DOCUMENTS

| | | | |
|---|---|---|---|
| CN | 206532100 | | 9/2017 |
| TW | 200844694 | | 11/2008 |
| TW | 201621485 | | 6/2016 |
| TW | 201621485 A | * | 6/2016 |
| TW | I578119 | | 4/2017 |

* cited by examiner

AUGMENTED REALITY DEVICE, NOTEBOOK, AND SMART GLASSES

CROSS-REFERENCE TO RELATED APPLICATION

This application claims the priority benefit of Taiwan application serial no. 108100256, filed on Jan. 3, 2019. The entirety of the above-mentioned patent application is hereby incorporated by reference herein and made a part of this specification.

BACKGROUND

Technical Field

The disclosure relates to an augmented reality (AR) device, a notebook, and smart glasses, and in particular to an AR device having a spatial light modulator (SLM) and a hologram optical element (HOE), a notebook, and smart glasses.

Description of Related Art

Augmented reality (AR) is a technology that integrates information such as visual effects, sound effects, and spatial information of a virtual world into real environment information, which not only shows information of the real environment, but also reveals the virtual information at the same time. By complementing and superimposing the above two types of information with each other, users can obtain richer perceptual information.

In general, AR display devices mostly need to occupy a certain physical space, and users may also need to wear polarized glasses to see stereoscopic images. In order to reduce the dimensions of the devices and facilitate users to directly view with eyes, it has been proposed in the prior art to use a light emitting diode (LED) as a system light source with a pure phase-modulated liquid crystal on silicon (LCoS) SLM design optical system, and employ appropriate hologram algorithms to generate stereoscopic images to achieve stereoscopic floating images in the AR environment.

However, since the above-mentioned conventional technique uses a general concave mirror to magnify a stereoscopic image, when other ambient light rays irrelevant to the stereoscopic image are also incident on the concave mirror, the mirror also reflects these light rays, and then the imaging quality of stereoscopic floating images is affected.

Therefore, it is an important issue for those skilled in the art to provide an improved AR device that can solve the above technical problems.

SUMMARY

The disclosure provides an AR device, which comprises a laser source, a spatial light modulator, and a hologram optical element. The laser source provides a coherent laser ray. The spatial light modulator provides a diffraction pattern, wherein when the spatial light modulator receives the coherent laser ray, the diffraction pattern diffracts the coherent laser ray as a hologram in response to the coherent laser ray. The hologram optical element provides a concave mirror effect merely in response to a wavelength of the coherent laser ray, wherein the hologram optical element receives the hologram and magnifies the hologram to provide a stereoscopic virtual image.

The disclosure provides a notebook, which comprises a laser source, a spatial light modulator, a hologram optical element, a keyboard dock, a display panel, and a mirror. The laser source provides a coherent laser ray. The spatial light modulator provides a diffraction pattern, wherein when the spatial light modulator receives the coherent laser ray, the diffraction pattern diffracts the coherent laser ray as a hologram in response to the coherent laser ray. The hologram optical element provides a concave mirror effect merely in response to a wavelength of the coherent laser ray, wherein the hologram optical element receives the hologram and magnifies the hologram to provide a stereoscopic virtual image. The keyboard dock has a top surface, and the laser source and the spatial light modulator are both disposed in the keyboard dock. A side of the display panel is hinged to the top surface of the keyboard dock, and the hologram optical element is disposed on the display panel. The mirror has a reflective surface, wherein a side of the mirror is hinged to the top surface of the keyboard dock, the reflective surface faces the hologram optical element disposed on the display panel, and the reflective surface receives the hologram formed after diffracting the coherent laser ray and reflects the hologram to the hologram optical element.

The disclosure provides a pair of smart glasses, which comprises a laser source, a spatial light modulator, a hologram optical element, a frame, a lens, and a mirror. The laser source provides a coherent laser ray. The spatial light modulator provides a diffraction pattern, wherein when the spatial light modulator receives the coherent laser ray, the diffraction pattern diffracts the coherent laser ray as a hologram in response to the coherent laser ray. The hologram optical element provides a concave mirror effect merely in response to a wavelength of the coherent laser ray, wherein the hologram optical element receives the hologram and magnifies the hologram to provide a stereoscopic virtual image. The frame has a side, and the laser source and the spatial light modulator are both disposed in the frame. A side of the lens is hinged to the side of the frame, and the hologram optical element is disposed on the lens. The mirror has a reflective surface, wherein a side of the mirror is hinged to the side of the frame, the reflective surface faces the hologram optical element disposed on the lens, and the reflective surface receives the hologram formed after diffracting the coherent laser ray and reflects the hologram to the hologram optical element.

Based on the above, the embodiments of the disclosure provide an AR device, which may diffract a coherent laser ray emitted from a laser source as a hologram in response to the coherent laser ray via a hologram optical element therein, and magnifies this hologram through the hologram optical element to a stereoscopic virtual image that can be viewed by the users. Since the hologram optical element provides a concave mirror effect merely in response to the wavelength of the aforementioned coherent laser ray, it is not affected by stray rays from the ambient environment while forming a stereoscopic virtual image, thereby providing better imaging quality.

To make the aforementioned features and advantages of the disclosure more comprehensible, embodiments accompanied with figures are described in detail below.

DESCRIPTION OF THE EMBODIMENTS

Figure 1A:
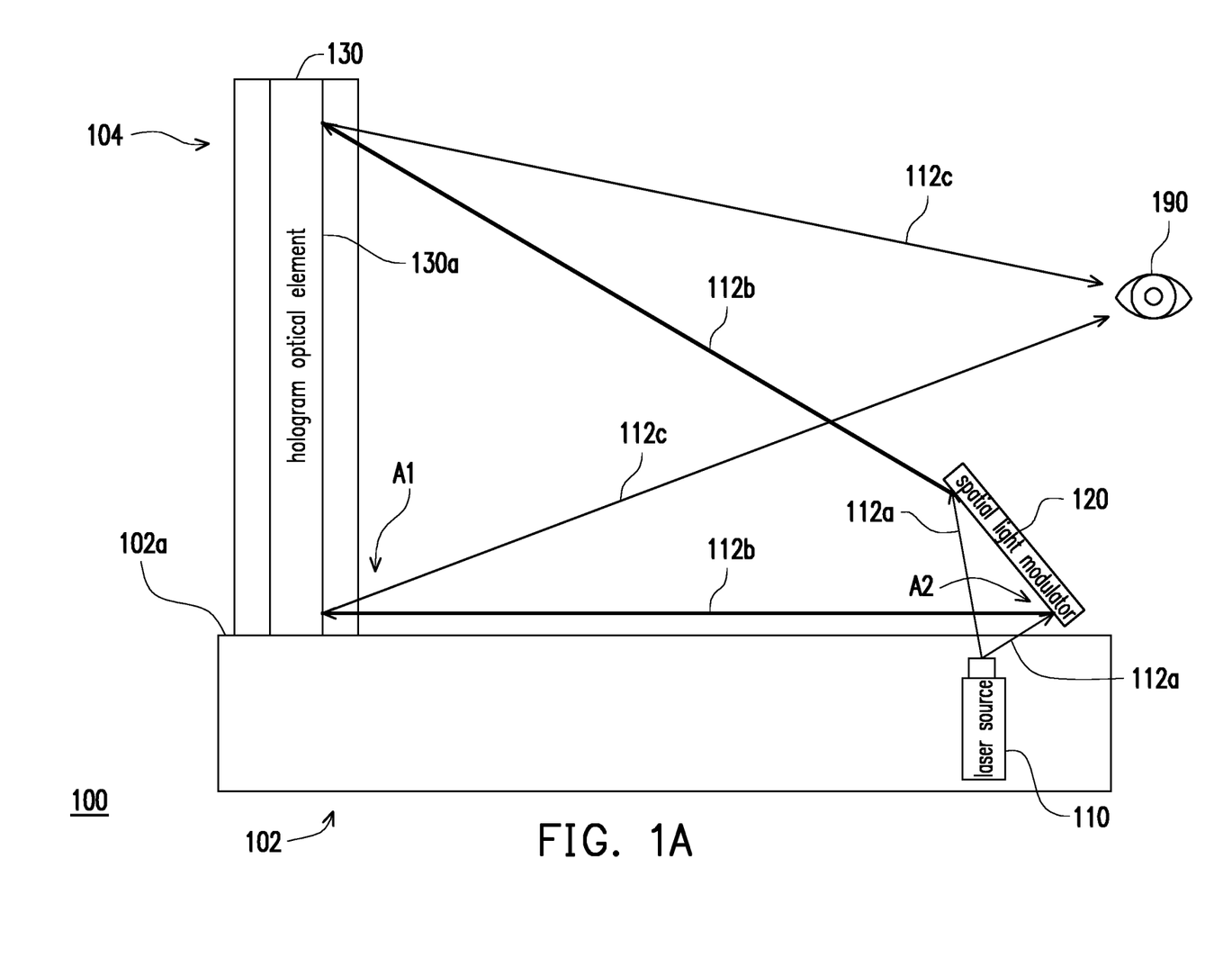
FIG. 1A is a side view of an AR device according to an embodiment of the disclosure.

Referring to FIG. 1A, which is a side view of an AR device according to an embodiment of the disclosure. In this embodiment, the AR device 100 includes a laser source 110, a spatial light modulator 120, and a hologram optical element 130. The laser source 110 provides a coherent laser ray 112a, while spatial light modulator 120 provides a diffraction pattern. In various embodiments, the diffraction pattern on the spatial light modulator 120 may be promptly changed to favorable configurations depending upon demands of the user 190, thereby diffracting an incident ray into a desired stereoscopic image by the diffraction pattern after receiving this incident ray (e.g., the coherent laser ray 112a).

Accordingly, when the spatial light modulator 120 of FIG. 1A receives the coherent laser ray 112a, the diffraction pattern on the spatial light modulator 120 may diffract the coherent laser ray 112a as a hologram 112b in response to the coherent laser ray 112a. In various embodiments, the hologram 112b may be a stereoscopic image for viewing by the user 190 and will be simply represented as a light ray in each of the following embodiments to facilitate description.

In one embodiment, the user 190 may control the spatial light modulator 120 to project the hologram 112b toward the hologram optical element 130 by adjusting the relative position between the spatial light modulator 120 and the laser 110. In another embodiment, the user 190 may also adjust the tilt angle of the hologram optical element 130 to enable the hologram optical element 130 to receive the hologram 112b projected by the spatial light modulator 120, but the disclosure is not limited thereto.

The hologram optical element 130 may provide a concave mirror effect merely in response to a wavelength of the coherent laser ray 112a. The hologram optical element 130 may receive the hologram 112b and magnify the hologram 112b to provide a stereoscopic virtual image 112c for viewing by the user 190.

In this embodiment, the hologram optical element 130 may have a surface 130a, and the surface 130a may provide a concave mirror effect merely in response to the wavelength of coherent laser ray 112a. For example, the surface 130a may be provided with a grating that solely corresponds to a wavelength of the coherent laser ray 112a. In other words, when stray rays of other wavelengths around the AR device 100 are incident on the surface 130a, the grating will not reflect these stray rays, thereby preventing from affecting the imaging quality of the stereoscopic virtual image 112c, and then the operation experience of the user is improved.

Moreover, since the hologram 112b may be magnified via the hologram optical element 130, a smaller-sized spatial light modulator 120 may be employed correspondingly, thereby reducing the dimensions of the AR device 100.

In an embodiment, the grating on the surface 130a may be implemented using nanometer-scale microstructures, such as a Gabor zone plate or a Fresnel zone plate, etc. In another embodiment, the hologram optical element 130 may be comprised of a volumetric hologram that solely corresponds to the wavelength of the coherent laser ray 112a, whereby providing a concave mirror effect merely in response to the wavelength of the coherent laser ray 112a.

In an embodiment, the position of the hologram 112b may be controlled to be between the 1× focal length and the 2× focal length corresponding to the concave mirror effect provided by the hologram optical element 130 through adjusting the relative positions among the elements in the AR device 100. In this way, the stereoscopic virtual image 112c may be formed outside the 2× focal length corresponding to the concave mirror effect provided by the hologram optical element 130, so that the user 190 may view the complete stereoscopic virtual image 112c successfully without feeling that the stereoscopic virtual image 112c is formed at a blocked position, such as, the left side or the like of the hologram optical element 130. Further, according to the optical imaging principle, the stereoscopic virtual image 112c formed outside the 2× focal length corresponding to the concave mirror effect provided by the hologram optical element 130 will be an magnified inverted real image of the hologram 112b, and the designer may cause the finally formed stereoscopic virtual image 112c to present as an upright image by adjusting the configuration of the diffraction pattern on the optical modulator 120.

Further, as shown in FIG. 1A, the AR device 100 may further include a base 102 and a panel 104. The base 102 has a top surface 102a, and the laser source 110 may be disposed in the base 102. A side of the panel 104 may be hinged to the top surface 102a of the base 102, and the hologram optical element 130 may be disposed on the panel 104. In addition, a side of the spatial light modulator 120 may be hinged to the top surface 102a of the base 102. The diffraction pattern of the spatial light modulator 120 may face (the surface 130a of) the hologram optical element 130 disposed on the panel 104, and after receiving and diffracting the coherent laser ray 112a to generate the hologram 112b, the hologram 112b is projected onto (the surface 130a of) the hologram optical element 130.

Further, since the panel 104 and the spatial light modulator 120 are both hinged to the top surface 102a, a first adjustable angle A1 may be regarded to exist between the panel 104 and the top surface 102a of the base 102, and a second adjustable angle A2 may be regarded to exist between the spatial light modulator 120 and the top surface 102a of the base 102. In this case, in order for the hologram 112b projected by the spatial light modulator 120 to be successfully projected onto (the surface 130a of) the hologram optical element 130, the first adjustable angle A1 may be negatively correlated with the second adjustable angle A2.

That is, when the second adjustable angle A2 is larger (for example, the spatial light modulator 120 is relatively upright), the first adjustable angle A1 needs to be adjusted correspondingly to be smaller, otherwise (the surface 130a of) the hologram optical element 130 may not receive the hologram 112b successfully and completely. In this case, the user 190 may observe the stereoscopic virtual image 112c approximately at the position shown in FIG. 1A. On the contrary, when the second adjustable angle A2 is smaller (for example, the spatial light modulator 120 is relatively horizontal), the first adjustable angle A1 needs to be adjusted correspondingly to be larger, otherwise (the surface 130a of) the hologram optical element 130 may not receive the hologram 112b successfully and completely either. In this case, the user 190 may observe the stereoscopic virtual image 112c approximately at the upper position of FIG. 1A.

In other words, when the user 190 needs to view the stereoscopic virtual image 112c at different positions, the user 190 may achieve this purpose by adjusting the relative relation between the first adjustable angle A1 and the second adjustable angle A2.

In an embodiment, the AR device 100 may be implemented as a notebook, in which the base 102 is, for example, a keyboard dock of this notebook, and the panel 104 is, for example, a display panel of this notebook. In this case, the laser source 110 may be disposed in the aforementioned keyboard dock, the spatial light modulator 120 may be implemented, for example, as an openable panel disposed on a top surface of the keyboard dock, and the hologram optical element 130 may be attached, for example, to the display surface of the display panel. In this way, when the user 190 wants the notebook to provide the stereoscopic virtual image 112c, the user 190 may open the spatial light modulator 120, whereby the spatial light modulator 120 and the hologram optical element 130 cooperate to operate as taught in the previous embodiments to cause the stereoscopic virtual image 112c floats between the user 190 and the display panel.

Figure 1B:
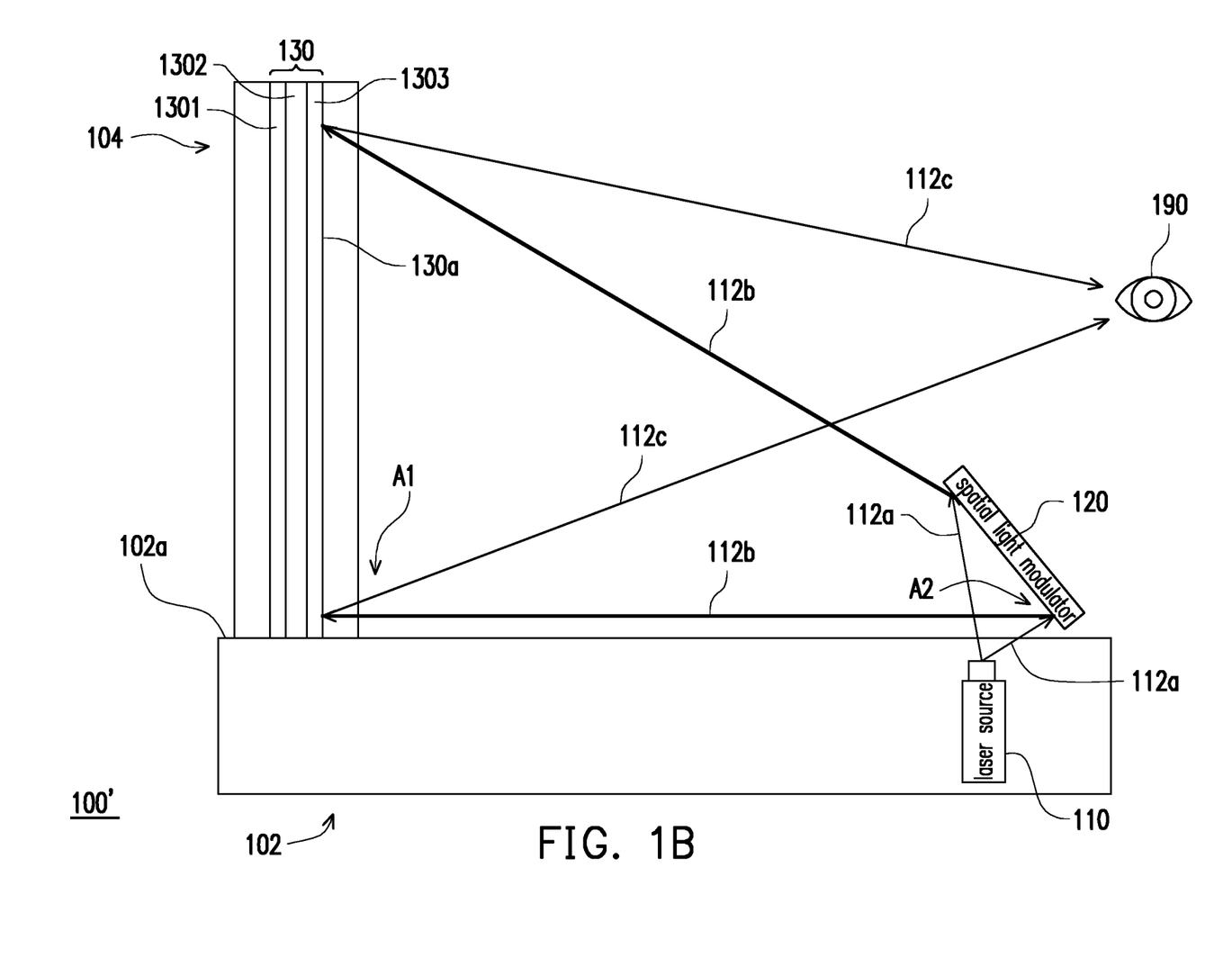
FIG. 1B is a side view of the AR device depicted according to FIG. 1A.

Referring to FIG. 1B, which is a side view of the AR device depicted according to FIG. 1A. The difference between the AR device 100' of this embodiment and the AR device 100 of FIG. 1A is mainly that the hologram optical element 130 of the AR device 100' may be fabricated by using a plurality of hologram optical lenses stacked on one another, and these hologram optical lenses may be designed as configurations individually corresponding to different wavelengths. For example, the hologram optical element 130 may include three hologram optical lenses 1301, 1302, and 1303 stacked on one another, and said three hologram optical lenses 1301-1303 may be used to diffract wavelengths corresponding to R, G, and B rays respectively, but the disclosure is not limited thereto.

Figure 2:
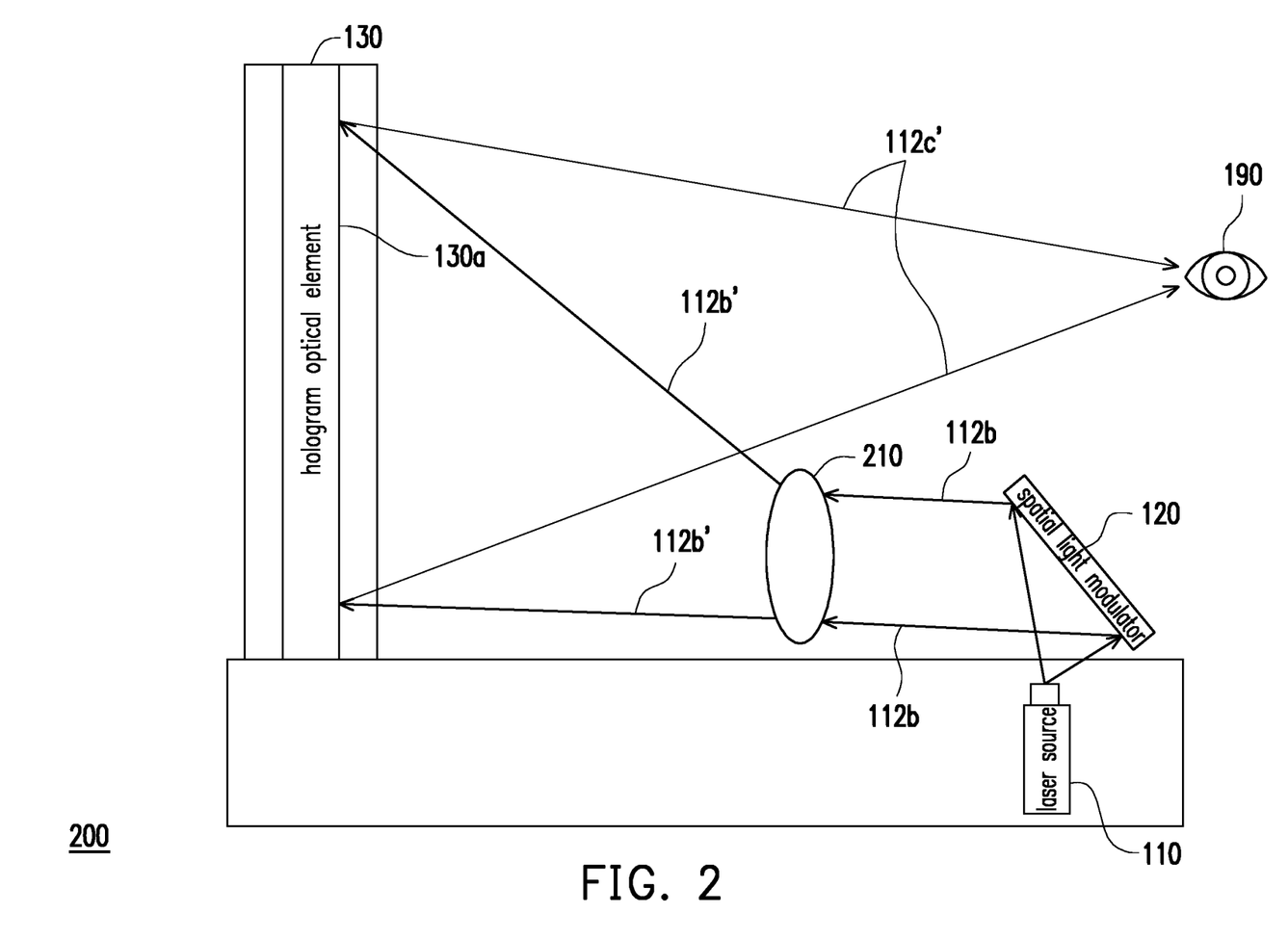
FIG. 2 is a side view of another AR device depicted according to FIG. 1A

Referring to FIG. 2, which is a side view of another AR device depicted according to FIG. 1A. In this embodiment, the AR device 200, compared to the AR device 100, further includes a convex lens 210 disposed between the diffraction pattern of the spatial light modulator 120 and (the surface 130a of) the hologram optical element 130, so as to receive and magnify the hologram 112b diffracted by the spatial light modulator 120, and project the magnified hologram 112b (indicated by the hologram 112b') onto (the surface 130a of) the hologram optical element 130. Accordingly, (the surface 130a of) the hologram optical element 130 may receive the hologram 112b' and magnify the hologram 112b' to provide a stereoscopic virtual image 112c' for viewing by the user 190.

In FIG. 2, since the convex lens 210 may be used to magnify the hologram 112b, a smaller-sized spatial light modulator 120 may be employed correspondingly, thereby providing the same visual effects upon occupying less space.

Figure 3:
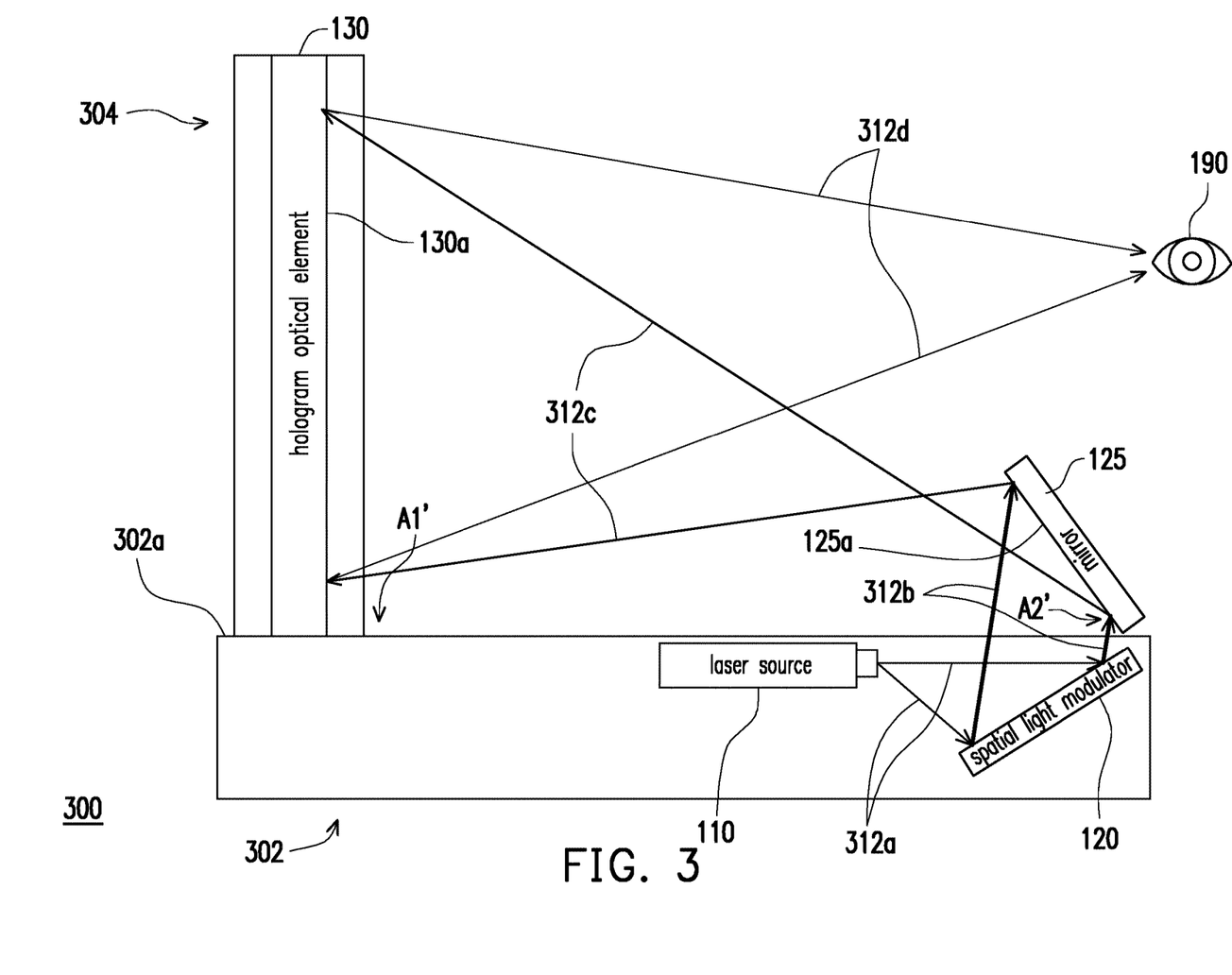
FIG. 3 is a side view of still another AR device depicted according to FIG. 1A.

Referring to FIG. 3, which is a side view of still another AR device depicted according to FIG. 1A. In this embodiment, the AR device 300 is, for example, a notebook, which may include a laser source 110, a spatial light modulator 120, a hologram optical element 130, a keyboard dock 302, a display panel 304, and a mirror 125. The keyboard dock 302 has a top surface 302a, and the laser source 110 and the spatial light modulator 120 are both disposed in the keyboard dock 302. A side of the display panel 304 is hinged to the top surface 302a of the keyboard dock 302, and the hologram optical element 130 is disposed on the display panel 304.

The laser source 110 provides a coherent laser ray 312a. The spatial light modulator 120 provides a diffraction pattern, in which when the spatial light modulator 120 receives the coherent laser ray 312a, the diffraction pattern diffracts the coherent laser ray 312a as a hologram 312b in response to the coherent laser ray 312a. The mirror 125 has a reflective surface 125a, in which a side of the mirror 125 is hinged to the top surface 302a of the keyboard dock 302, the reflective surface 124a faces (the surface 130a of) the hologram optical element 130 disposed on the display panel 304, and the reflective surface 125a receives the hologram 312b formed after diffracting the coherent laser ray 312a, and the hologram 312b is reflected as the hologram 312c to project onto (the surface 130a of) the hologram optical element 130.

In this embodiment, for the operation method of the laser source 110, the spatial light modulator 120, and the hologram optical element 130, reference may be made to the related description of FIG. 1A and FIG. 2, and details thereof will be omitted here. Further, same as the previous embodiments, (the surface 130a of) the hologram optical element 130 receives the hologram 312c and magnifies the hologram 312c to provide a stereoscopic virtual image 312d to the user 190 for viewing. Also, (the surface 130a of) the hologram optical element 130 may provide a concave mirror effect merely in response to the wavelength of the coherent laser ray 112a. In other words, when stray rays of other wavelengths around the AR device 300 are incident on (the surface 130a of) the hologram optical element 130, the above-mentioned stray rays will not be reflected, thereby preventing from affecting the imaging quality of the stereoscopic virtual image 312d, and then the operation experience of the user is improved.

In an embodiment, the position of the hologram 312c may be controlled between the 1× focal length and the 2× focal length corresponding to the concave mirror effect provided by the hologram optical element 130 through adjusting the degree of openness of the mirror 125. In this way, the stereoscopic virtual image 312d may be formed outside the 2× focal length corresponding to the concave mirror effect provided by the hologram optical element 130, so that the user 190 may view the complete stereoscopic virtual image 312d successfully without feeling that the stereoscopic virtual image 312d is formed at a blocked position, such as, behind the display panel 304 or the like. Further, according to the optical imaging principle, the stereoscopic virtual image 312d formed outside the 2× focal length corresponding to the concave mirror effect provided by the hologram optical element 130 will be an magnified inverted real image of the hologram 312c, and the designer may cause the finally formed stereoscopic virtual image 312d to present as an upright image by adjusting the configuration of the diffraction pattern on the optical modulator 120.

As can be seen from FIG. 3, the difference between FIG. 3 and FIG. 1A is mainly that the laser source 110 and the spatial light modulator 120 are both disposed in the keyboard dock 302, and a mirror 125 hinged to the top surface 302a is additionally provided.

Since the display panel 304 and the mirror 125 are both hinged to the top surface 302a, a first adjustable angle A1' may be regarded to exist between the display panel 304 and the top surface 302a of the keyboard dock 302, and a second adjustable angle A2' may be regarded to exist between the mirror 125 and the top surface 302a of the keyboard dock 302. In this case, in order for the hologram 312c reflected by the mirror 125 to be successfully projected onto (the surface 130a of) the hologram optical element 130, the first adjustable angle A1' may be negatively correlated with the second adjustable angle A2'.

That is, when the second adjustable angle A2' is larger (for example, the mirror 125 is relatively upright), the first adjustable angle A1' needs to be adjusted correspondingly to be smaller, otherwise (the surface 130a of) the hologram optical element 130 may not receive the hologram 312c successfully and completely. In this case, the user 190 may observe the stereoscopic virtual image 312d approximately at the position shown in FIG. 3. On the contrary, when the second adjustable angle A2' is smaller (for example, the mirror 125 is relatively horizontal), the first adjustable angle A1' needs to be adjusted correspondingly to be larger, otherwise (the surface 130a of) the hologram optical element 130 may not receive the hologram 312c successfully and completely. In this case, the user 190 may observe the stereoscopic virtual image 312d approximately at the upper position of FIG. 3.

In other words, when the user 190 needs to view the stereoscopic virtual image 312d at different positions, the user 190 may achieve this purpose by adjusting the relative relation between the first adjustable angle A1' and the second adjustable angle A2'.

In FIG. 3, the mirror 125 may be implemented, for example, as an openable panel disposed on the top surface 302a of the keyboard dock 302. Therefore, when the user 190 wants the AR device 300 to provide the stereoscopic virtual image 312d, the user 190 may open the mirror 125, whereby the spatial light modulator 120, the mirror 125, and the hologram optical element 130 cooperate to operate as taught in the previous embodiments to cause the stereoscopic virtual image 312d floats between the user 190 and the display panel 304.

Figure 4:
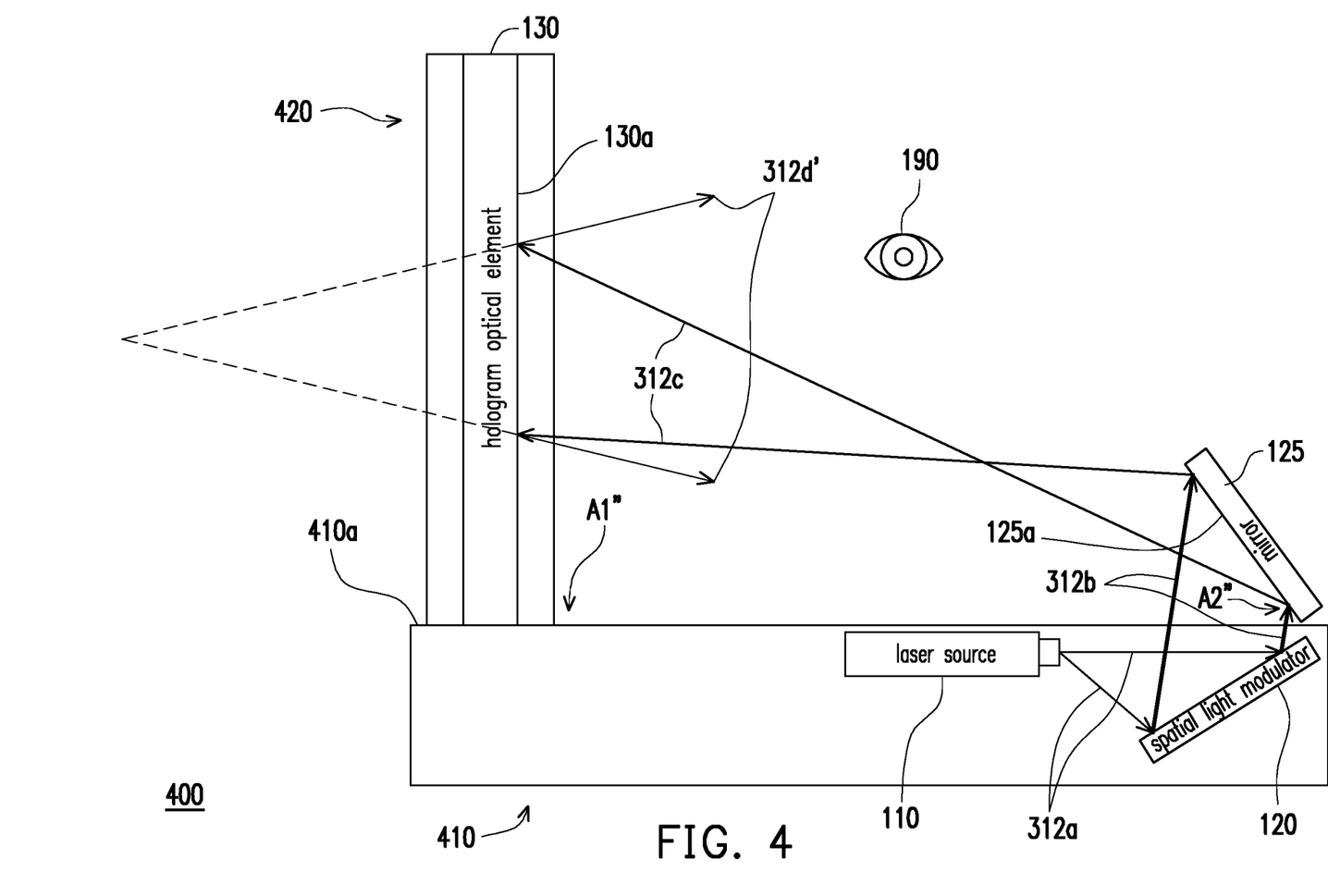
FIG. 4 is a top view of an AR device according to an embodiment of the disclosure.

Referring to FIG. 4, which is a top view of an AR device according to an embodiment of the disclosure. In this embodiment, the AR device 400 is, for example, a pair of smart glasses, and FIG. 4 is a top view of the left half of the pair of smart glasses. In detail, the AR device 400 includes a laser source 110, a spatial light modulator 120, a mirror 125, a hologram optical element 130, a frame 410, and a lens 420. The laser source 110 provides a coherent laser ray 312a. The spatial light modulator 120 provides a diffraction pattern, in which when the spatial light modulator 120 receives the coherent laser ray 312a, the diffraction pattern diffracts the coherent laser ray 312a as a hologram 312b in response to the coherent laser ray 312a.

The frame 410 has a side surface 410a, and the laser source 110 and the spatial light modulator 120 are both disposed in the frame 410. A side of the lens 420 is hinged to the side 410a of the frame 410, and the hologram optical element 130 is disposed on the lens 420. The mirror 125 has a reflective surface 125a, a side of the mirror 125 is hinged to the side 410a of the frame 410, the reflective surface 125a faces (the surface 130a of) the hologram optical element 130 disposed on the lens 420, and the reflective surface 125a receives the hologram 312b formed after diffracting the coherent laser ray 312a, and reflects the hologram 312b as the hologram 312c i to (the surface 130a of) the hologram optical element 130.

In this embodiment, for the operation method of the laser source 110, the spatial light modulator 120, and the hologram optical element 130, reference may be made to the related description of FIG. 1A and FIG. 2, and details thereof will be omitted here. Further, same as the previous embodiments, (the surface 130a of) the hologram optical element 130 receives the hologram 312c and magnifies the hologram 312c to provide a stereoscopic virtual image 312d' to the user 190 for viewing. Also, (the surface 130a of) the hologram optical element 130 may provide a concave mirror effect merely in response to the wavelength of the coherent laser ray 112a. In other words, when stray rays of other wavelengths around the AR device 400 are incident on (the surface 130a of) the hologram optical element 130, the above-mentioned stray rays will not be reflected, thereby preventing from affecting the imaging quality of the stereoscopic virtual image 312d', and then the operation experience of the user is improved.

In an embodiment, the position of the hologram 312c may be controlled within the 1× focal length corresponding to the concave mirror effect provided by the hologram optical element 130 through adjusting the degree of openness of the mirror 125. In this way, the stereoscopic virtual image 312d' may be formed on the other side of the lens 420, so that the user 190 feels that the stereoscopic virtual image 312d' floats in front of the lens 420 (for example, at the intersection of the dotted lines as shown).

In this embodiment, since the lens 420 and the mirror 125 are both hinged to the side surface 410a, a first adjustable angle A1" may be regarded to exist between the lens 420 and the side surface 410a, and a second adjustable angle A2" may be regarded to exist between the mirror 125 and the side surface 410a. In this case, in order for the hologram 312c reflected by the mirror 125 to be successfully projected onto (the surface 130a of) the hologram optical element 130, the first adjustable angle A1" may be negatively correlated with the second adjustable angle A2".

That is, when the second adjustable angle A2" is larger (for example, the mirror 125 is relatively upright), the first adjustable angle A1" needs to be adjusted to be smaller, otherwise (the surface 130a of) the hologram optical element 130 may not receive the hologram 312c successfully and completely. In this case, the user 190 may observe the stereoscopic virtual image 312d' approximately at the position shown in FIG. 4. On the contrary, when the second adjustable angle A2" is smaller (for example, the mirror 125 is relatively horizontal), the first adjustable angle A1" needs to be adjusted correspondingly to be larger, otherwise (the surface 130a of) the hologram optical element 130 may not receive the hologram 312c successfully and completely. In this case, the user 190 may observe the stereoscopic virtual image 312d' approximately at the upper position of FIG. 4.

In other words, when the user 190 needs to view the stereoscopic virtual image 312d' at different positions, the user 190 may achieve this purpose by adjusting the relative relation between the first adjustable angle A1" and the second adjustable angle A2".

In FIG. 4, the mirror 125 may be implemented, for example, as an openable panel disposed on the side 410a. Therefore, when the user 190 wants the AR device 400 to provide the stereoscopic virtual image 312d', the user 190 may open the mirror 125, whereby the spatial light modulator 120, the mirror 125, and the hologram optical element 130 cooperate to operate as taught in the previous embodiments to provide the stereoscopic virtual image 312d' to the user for viewing.

In summary, the embodiments of the disclosure provide an AR device, which may diffract a coherent laser ray emitted from a laser source as a hologram in response to the coherent laser ray via a hologram optical element therein, and magnifies this hologram through the hologram optical element to a stereoscopic virtual image that can be viewed by the users. Since the hologram optical element provides a concave mirror effect merely in response to the wavelength of the coherent laser ray, it is not affected by stray rays from the ambient environment while forming a stereoscopic virtual image, thereby providing better imaging quality. Further, the embodiments of the disclosure magnify the hologram diffracted by the spatial light modulator via disposing a convex lens, thereby the smaller-sized spatial light modulator may be employed to achieve the functions of the AR.

Moreover, the embodiments of the disclosure also proposes a technical means for changing a projection direction of the hologram by a mirror, such that a laser source and a spatial light modulator may be disposed in a keyboard dock and in a frame, which not only reduces the dimensions of the AR devices but also provide a novel architecture for AR devices.

Although the disclosure has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. An augmented reality (AR) device comprising:
    a laser source providing a coherent laser ray with a single wavelength;
    a spatial light modulator providing a diffraction pattern, wherein when the spatial light modulator receives the coherent laser ray, the diffraction pattern diffracts the coherent laser ray as a hologram in response to the coherent laser ray; and
    a hologram optical element comprises a surface providing a concave mirror effect merely in response to the single wavelength of the coherent laser ray, wherein the surface of the hologram optical element is provided with a grating that solely corresponds to the single wavelength of the coherent laser ray, and the hologram optical element receives the hologram and magnifies the hologram to provide a stereoscopic virtual image, wherein upon the coherent laser ray with the single wavelength incident on the surface or the grating, the grating only reflects the coherent laser ray with the single wavelength and does not reflect lights with other wavelengths.

2. The AR device of claim 1, further comprising:
    a base having a top surface, and the laser source is disposed in the base;
    a panel, wherein a side of the panel is hinged to the top surface of the base, and the hologram optical element is disposed on the panel;
    wherein a side of the spatial light modulator is hinged to the top surface of the base, the diffraction pattern faces the hologram optical element disposed on the panel and projecting the hologram onto the hologram optical element after receiving and diffracting the coherent laser ray to generate the hologram.

3. The AR device of claim 2, wherein a first adjustable angle exists between the panel and the top surface of the base, a second adjustable angle exists between the spatial light modulator and the top surface of the base, and the first adjustable angle is negatively correlated with the second adjustable angle.

4. The AR device of claim 2, further comprising a convex lens disposed between the diffraction pattern and the hologram optical element, receiving and magnifying the hologram diffracted by the spatial light modulator, and projecting the magnified hologram onto the hologram optical element.

5. The AR device of claim 1, further comprising:
    a base having a top surface, and the laser source and the spatial light modulator are both disposed in the base;
    a panel, wherein a side of the panel is hinged to the top surface of the base, and the hologram optical element is disposed on the panel; and
    a mirror having a reflective surface, wherein a side of the mirror is hinged to the top surface of the base, the reflective surface faces the hologram optical element disposed on the panel, and the reflective surface receives the hologram formed after diffracting the coherent laser ray and reflects the hologram to the hologram optical element.

6. The AR device of claim 5, wherein a first adjustable angle exists between the panel and the top surface of the base, a second adjustable angle exists between the reflective surface and the top surface of the base, and the first adjustable angle is negatively correlated with the second adjustable angle.

7. The AR device of claim 5, wherein the position of the hologram is located between 1× focal length and 2× focal length corresponding to the concave mirror effect.

8. The AR device of claim 1, further comprising:
    a support having a side, and the laser source and the spatial light modulator are both disposed in the support;
    a lens, wherein a side of the lens is hinged to the side of the support, and the hologram optical element is disposed on the lens;
    a mirror having a reflective surface, wherein a side of the mirror is hinged to the side of the support, the reflective surface faces a surface of the hologram optical element disposed on the lens, and the reflective surface receives the hologram formed after diffracting the coherent laser ray and reflects the hologram to the hologram optical element.

9. The AR device of claim 8, wherein a first adjustable angle exists between the lens and the side of the support, a second adjustable angle exists between the reflective surface and the side of the support, and the first adjustable angle is negatively correlated with the second adjustable angle.

10. The AR device of claim 8, wherein the position of the hologram is located within 1× focal length corresponding to the concave mirror effect.

11. The AR device of claim 1, wherein the hologram optical element is fabricated with a plurality of hologram optical lenses stacked on one another, wherein each of the hologram optical lenses is used to diffract different wavelengths.

* * * * *